May 16, 1933.  E. RIDGILL  1,909,317
JIGGER CONVEYER
Filed April 15, 1932
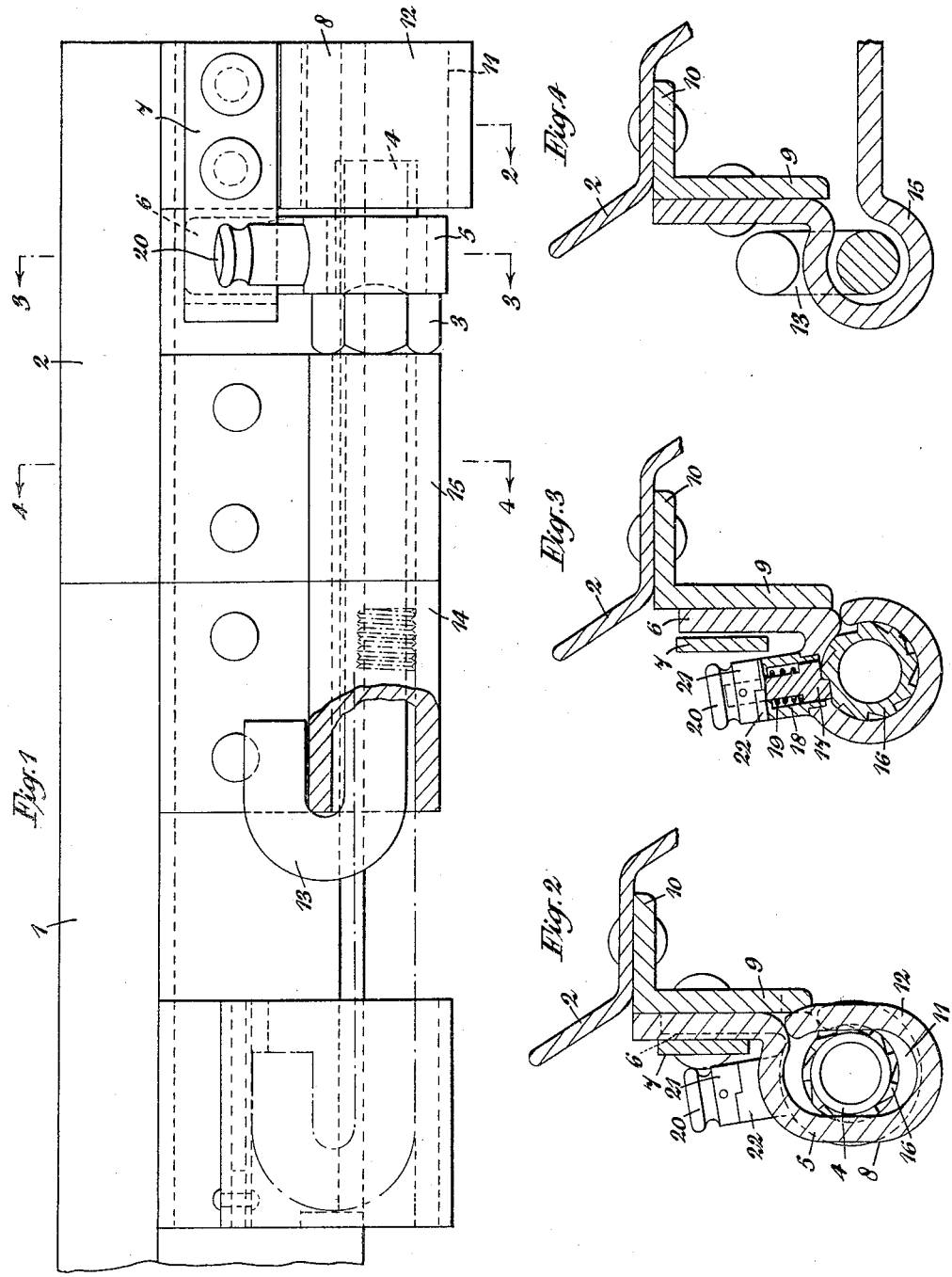
INVENTOR.
Ernest Ridgill
by Speer, Donaldson & Hull
ATTYS Patented May 16, 1933

1,909,317

UNITED STATES PATENT OFFICE

ERNEST RIDGILL, OF DRONFIELD, SHEFFIELD, ENGLAND

JIGGER CONVEYER

Application filed April 15, 1932, Serial No. 605,507, and in Great Britain November 4, 1931.

This invention relates to jigger conveyers and comprises an improved nut-and-bolt coupling for connecting together adjacent trough-sections of such a conveyer.

In the specification of my prior United States Patent No. 1,876,317, issued on the 6th September, 1932, I have described a form of nut-and-bolt coupling for the purpose referred to, comprising a bolt mounted in a lug at the end of one of the adjacent trough sections to slide endwise of itself into and out from an operative position in which it reaches through a similar opposed lug on the other section. The bolt is screw-threaded at its extremity, and when it is in its operative position it is engaged by a clamping nut fitting over the screw-threaded extremity of the bolt. This nut, which co-operating with a bead on the bolt, serves to clamp the two lugs and thereby the two trough sections firmly together, is revolubly mounted in alignment with the bolt in a bracket provided to receive it on that trough section which abuts the trough section carrying the bolt. To this end the nut is provided with an axial extension which is received within a co-axial boss on the bracket. In order to retain the nut in its full clamping position and prevent it from becoming accidentally displaced therefrom, the nut is provided with a spring-pressed detent pawl co-operating with ratchet teeth on the end face of the axial extension of the nut and having a manipulating knob whereby it may be withdrawn against its spring control out of engagement with the ratchet teeth to release the nut and permit the latter to be turned in the direction to become disengaged from the bolt. The spring control for the detent consists of a compression spring interposed between the end face of the said extension of the nut and the head of a plunger, the shank of which projects into the interior of the nut extension from the detent knob.

It has been found with this construction that in course of use, the interior of the nut tends to become clogged with coal dust, with the result that the detent is prevented from occupying its proper operative position in relation to the ratchet teeth, the extremity of the bolt, as the nut is screwed home upon it, forcing the collection of coal dust, grit and the like against the head of the plunger, and thus displacing the plunger in the direction to disengage the detent from the ratchet teeth.

The present invention is intended to obviate this disadvantage and accordingly consists of an improved form of nut-and-bolt coupling of the general character indicated above, comprising a lug to be mounted upon one end of one of the trough-sections to be coupled, a similar lug to be mounted in alignment therewith upon the adjacent end of the other trough-section a bolt mounted in one of said lugs to slide therein endwise of itself to and from an operative position to which it reaches through and projects at its leading end beyond the other lug, the said bolt having a head at its rear end and being screw-threaded at its forward end where it projects beyond said other lug, a clamping nut to screw on to the end of the bolt for clamping thereby the two lugs together, an open-ended tubular extension on the nut projecting from the rear face thereof away from the bolt, ratchet teeth on the periphery of said nut extension, a bracket to be mounted on the second-mentioned trough-section to carry the clamping nut when the bolt is withdrawn therefrom, a sleeve forming part of said bracket and surrounding the nut extension so as to cover the teeth thereon, and a spring-pressed detent mounted in said sleeve radially of the nut extension for automatic locking engagement with the ratchet teeth.

With this construction, as will be appreciated, the presence of a pocket at the rear end of the nut extension within which coal dust, dirt and the like may accumulate in course of use of the coupling is avoided; any dirt or the like which may find its way into the nut extension will be simply pushed out through the open end of the extension by the nose of the bolt and will therefore be incapable of in any way interfering with the action of the detent. At the same time the ratchet teeth with which the detent co-operates are effectively covered against fouling by access of dirt and the like from without by the tubular housing which surrounds them and carries the detent.

Preferably, and according to a feature of the invention, the clamping nut, the housing around the tubular extension thereof and the spring-pressed detent mounted in said housing, are provided, in their mounting in the bracket, with freedom of substantially vertical movement together so as to be readily accommodable to the position of the bolt.

One convenient embodiment of the invention will now be described with reference to the accompanying drawing of which:—

Figure 1 is a side elevation of the improved conveyer coupling; and

Figures 2, 3 and 4 are cross-sections through the coupling taken on the section lines 2—2, 3—3, 4—4, respectively, of Figure 1.

Like reference characters indicate like parts in the various figures.

Referring to Figure 1, the two trough sections of the conveyer are denoted respectively by the numerals 1, 2. The bolt assembly of the improved coupling is carried on the conveyer section 1 and its construction is the same as that of the coupling described in the specification of my said prior United States Patent No. 1,876,317. It will therefore not be described here.

The nut assembly is carried on the conveyer section 2. It comprises a nut 3 provided at one end with an axial extension 4 as in the construction described in the parent application. This extension 4 reaches through the boss of a bracket which consists of a boss 5 to receive the nut extension 4 and an upwardly extending arm 6 integral with the boss 5. When the parts are in their assembled positions, the arm 6 is accommodated with a certain amount of freedom of movement behind a retaining strap 7 extending in the direction of length of the nut 3 from the face of a second bracket 8. This bracket 8 is rivetted to the downwardly directed flange 9 of a horizontal angle bar, the other flange 10 of which is rivetted in turn to the underside of the trough section 2 carrying the bolt assembly.

The axial extension 4 of the nut is hollow and in length is approximately twice the axial length of the boss 5 and, as shown, said boss surrounds that portion of the extension 4 which is immediately adjacent the head portion of the nut. The outer end of the nut extension 4 is received within an elongated hole 11 in the boss 12 of the second-mentioned bracket. This hole is of elongated form to allow the nut extension 5 to rise and fall slightly and thereby accommodate itself to the position of the bolt 13 of the improved coupling.

The bolt 13 is slidable from an operative position (shown in full lines in Figure 1) to an inoperative stowage position (shown in dotted lines) along the bosses of two lugs 14, 15 mounted, respectively, upon the two conveyer sections 1, 2, in alignment with one another. The arrangement in this respect corresponds to that described and shown in the parent application.

That portion of the periphery of the nut extension 4 which is surrounded by the boss 5 is formed with ratchet teeth 16 disposed axially of the nut extension, and co-operating with these teeth is a spring-pressed detent, the axis of which is radial to the nut extension. This detent takes the form of a plunger 17 slidably mounted within a hollow housing 18 projecting radially from the boss 5, against the constraint of a compression spring 19 interposed between the head of the plunger 17 and the outer end of the housing 18. The shank of the plunger 17 extends through said end of the housing and is provided at its outer end with a manipulating knob 20. This knob is formed with a dog or tooth 21 on its underside, which co-operates with a corresponding recess 22 in the end face of the plunger housing to retain the plunger 17 in its withdrawn position when required by a part turn of the plunger about its axis from the position which it normally occupies, that is to say, the position which it occupies when the detent and its ratchet teeth are in their working positions.

As will be appreciated, with this construction, should any coal dust, grit or the like collect within the interior of the nut, the extremity of the bolt will simply force the collection of dust or the like into and through the hollow extension, from which it will discharge without in any way interfering with the detent and ratchet mechanism.

What I claim is:—

1. In a jigger conveyer trough-section coupling, a lug to be mounted upon one end of one of the trough-sections to be coupled, a similar lug to be mounted in alignment therewith upon the adjacent end of the other trough-section, a bolt mounted in one of said lugs to slide therein endwise of itself to and from an operative position in which it reaches through and projects at its leading end beyond the other lug, the said bolt having a head at its rear end and being screw-threaded at its forward end where it projects beyond said other lugs, a clamping nut to screw on to the end of the bolt for clamping thereby the two lugs together, an open-ended tubular extension on the nut projecting from the rear face thereof away from the bolt, ratchet teeth on the periphery of said nut extension, a bracket to be mounted on the second-mentioned trough-section to carry the clamping nut when the bolt is withdrawn therefrom, a sleeve forming part of said bracket and surrounding the nut extension so as to cover the teeth thereon, and a spring-pressed detent mounted in said sleeve radially of the nut extension for automatic locking engagement with the ratchet teeth.

2. In a jigger conveyer trough-section coupling, the parts specified in claim 1 in a form in which the clamping nut, the sleeve on the extension thereof and the spring-pressed detent, have together freedom of substantially vertical movement in the bracket so as to be readily accommodable to the position of the bolt.

ERNEST RIDGILL.